Figure 1:
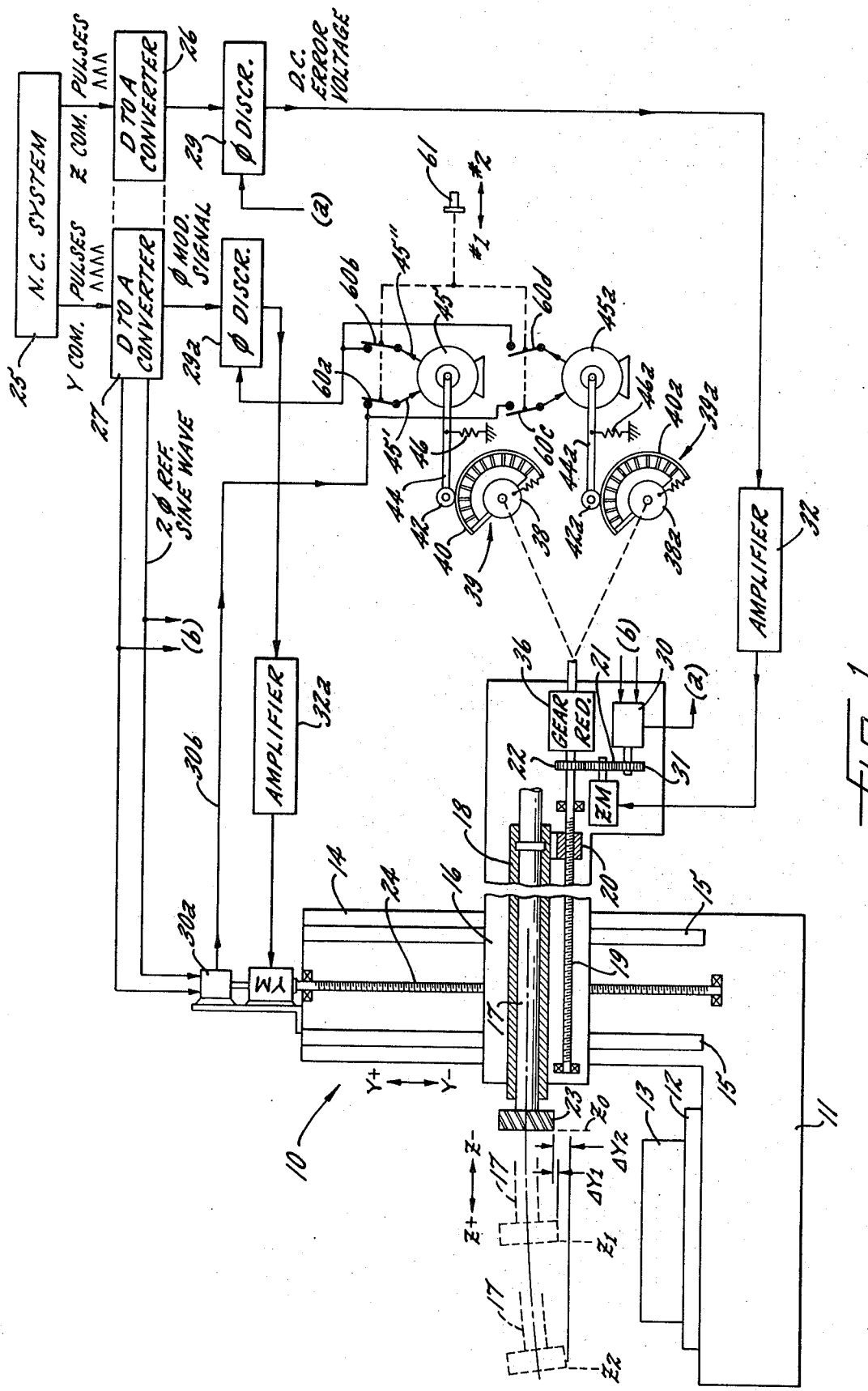

United States Patent

Hurd

[11] 3,827,333
[45] Aug. 6, 1974

[54] GRAVITY SAG COMPENSATION SYSTEM
[75] Inventor: John E. Hurd, Rockford, Ill.
[73] Assignee: The Ingersoll Milling Machine Company, Rockford, Del.
[22] Filed: June 29, 1973
[21] Appl. No.: 375,108

[52] U.S. Cl............... 90/14, 90/DIG. 28, 318/632, 408/3, 408/13
[51] Int. Cl. ...... B23c 1/02, B23c 9/00, B23b 39/08
[58] Field of Search 318/632; 90/11 A, 14, DIG. 28; 408/3, 235, 13

[56] References Cited
UNITED STATES PATENTS
| | | | |
|---|---|---|---|
| 3,097,568 | 7/1963 | Kampmeier | 90/DIG. 28 |
| 3,211,025 | 10/1965 | Motto | 408/13 |
| 3,348,435 | 10/1967 | Lauper | 318/632 |

Primary Examiner—Francis S. Husar
Attorney, Agent, or Firm—Wolfe, Hubbard, Leydig, Voit & Osann, Ltd.

[57] ABSTRACT

In a machine tool having a headstock vertically movable along a Y axis and a spindle horizontally extensible from the headstock along a Z axis, the sag or droop of the extremity of the spindle as a cantilever member will change as the spindle position along the Z axis is changed. A compensating system is here disclosed which senses the Z axis position of the spindle to create a signal varying as a predetermined function of that position to represent the amount of sag for a given weight load on the spindle. That signal is injected into the servo positioning loop for the Y axis to make the positioned height of the headstock correspondingly greater than that designated by a Y axis command, such that the cutter on the spindle extremity ends up at the commanded and desired Y axis position. This substantially eliminates workpiece errors otherwise arising because of spindle drooping under gravity, especially when the sensed spindle is extended by a relatively great amount from its supporting headstock. The sensing and signal producing device is physically adjustable to enable matching of the predetermined function to observed amounts of sag for different weight loads. A plurality of such devices may be pre-adjusted for different weight loads and then selectively switched into the system when each load is actually placed on the spindle.

8 Claims, 2 Drawing Figures

GRAVITY SAG COMPENSATION SYSTEM

The present invention relates in general to the controlled positioning of movable members such, for example, as work or cutter supports in the machine tools; and in particular to the precise positioning of the extremities of extendable, overhanging members which are supported in cantilever fashion.

It is a common arrangement in horizontal boring, milling or drilling machines to support a rotatably driven cutter-carrying spindle in a headstock such that the spindle may be fed horizontally to different extended positions along what the industry usually calls the Z axis. The headstock itself (and thus the spindle bodily therewith) is positionable along a vertical or Y axis, and the workpiece may be carried by a table translatable along a horizontal X axis —making a three orthogonal axis system for contouring or positioning under numerical control. Especially in the larger machine tools, the spindle may often be extended to project by relatively large distances (e.g., up to 60 inch) from the headstock, and no matter how stiff or large in diameter, the outer extremity of the spindle will sag or droop due to gravity, the effect being more pronounced as heavier cutters or right-angle attachments are mounted on the spindle. Since it is the vertical or Y axis position of the headstock itself which is controlled by the numerical control system, any such sag or droop may create perceptible and unacceptable inaccuracies in the dimensions of a finished workpiece, especially when the permissible tolerances are quite small.

It is the primary aim of the present invention substantially to eliminate errors due to gravity sag of an elongated member as the latter is extended or retracted horizontally relative to a horizontally fixed support which carries that member in cantilever fashion.

A related object is to provide compensation for gravity sag of such a member automatically by continuously sensing the horizontal position of the member along one axis (Z axis) and introducing a correction signal, derived as a predetermined function of that position, into the servo system which controls the vertical positioning of the support along another, vertical axis (Y axis), —thereby to keep the extremity of the member at the desired vertical position.

It is a further and more specific object to provide a compensating system wherein the predetermined and arbitrary function may easily be established with little time and effort, and can be readily changed when a load of different weight is mounted on the extremity of the extensible member.

Still another object is to permit two or more predetermined functions to be physically incorporated into the compensation system for two or more different weight loads, and to bring the correct function into play quickly and conveniently as different ones of the loads are imposed upon the elongated member.

It is, moreover, an object of the invention to make the operation and produced workpieces of horizontal machine tools more precise, accurate and immune from gravity drooping of the spindle as it is extended to various horizontal Z axis positions, and to accomplish this in a fashion which requires no special attention or duties of the machine operator after initial setup with a given cutter or cutters.

Figure 2:
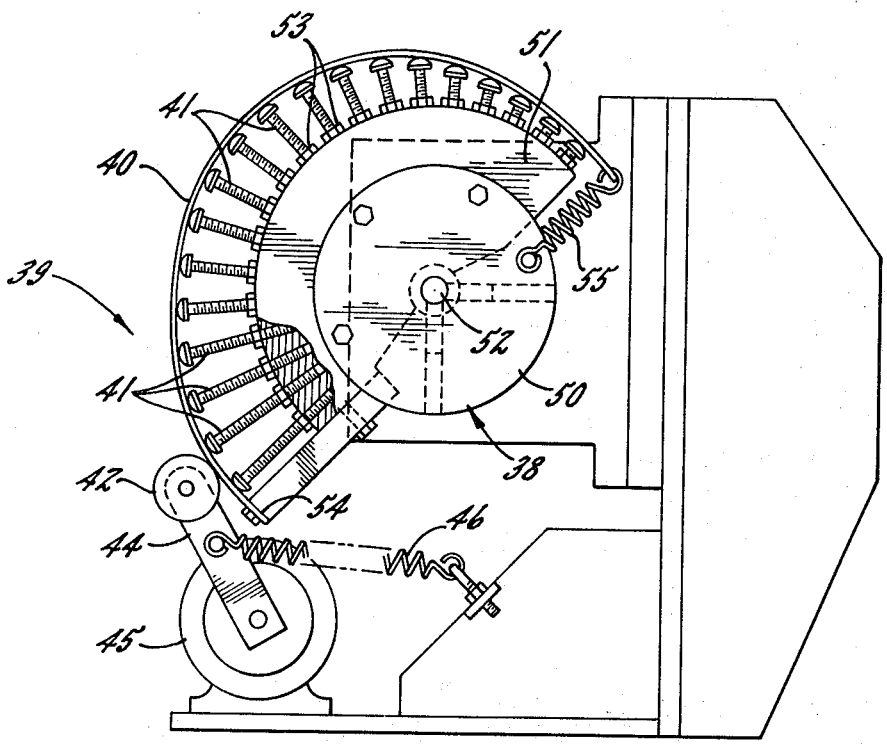

These and other objects of the invention will become apparent as the following description proceeds with reference to the accompanying drawings, in which:

FIG. 1 is a diagrammatic illustration of a horizontal boring or milling machine associated with a numerical control system, together with the improvements which constitute an exemplary embodiment of the present invention; and FIG. 2 is an elevation view of an exemplary cam, follower and transducer assembly of the type shown generally in FIG. 1.

While the invention has been shown and will be described in some detail with reference to a particular embodiment thereof, there is no intention that it thus be limited to such detail. On the contrary, it is intended here to cover all equivalents, modifications and alternatives which may fall within the spirit and scope of the invention as defined by the appended claims.

Referring now to FIG. 1, a horizontal milling machine 10 is shown in a very diagrammatic and informal fashion as an example of one environment or application in which the present invention will find advantageous use. The machine 10, as is per se well known, includes a base 11 supporting a table or saddle 12 movable (by drive means not shown) along an X axis and adapted to receive a workpiece 13. Adjacent to or extending from the base is a column 14 having vertical ways 15 slidably guiding a headstock 16 which constitutes a horizontally fixed but vertically positionable movable support for an elongated member, here a spindle 17.

The spindle is journaled for rotation (by drive means not shown) in a quill 18 but fixed against axial movement within the quill. The quill, and thus the spindle therewith, is extendable and retractable relative to the headstock along a horizontal or Z axis. For this purpose, a precision lead screw 19 is journaled within the headstock and engaged by a cooperating nut 20 fastened to the quill. As part of a servo drive means for moving the quill and spindle in and out to various commanded positions, a reversible servo motor ZM is coupled to the lead screw 19 through gears 21 and 22. As will be apparent, the free extremity of the spindle is adapted to carry a changeable cutter 23 (or indeed a right angle attachment with a cutter) which creates a weight load. It has been found that as the spindle is extended progressively, and because it is supported at its right end in the fashion of a cantilever, it tends to sag or droop to an extent not necessarily perceptible to the eye but sufficient to create intolerable inaccuracies in the vertical locations of machine surfaces formed by the cutter on the workpiece. This is shown to an exaggerated degree by the two phantom positions of the spindle 17 in FIG. 1.

As a part of servo drive means to move the headstock 16 to various desired positions vertically along the Y axis, a precision lead screw 24 is rotatably supported on the column 14 and engaged with cooperating nuts (not shown) fixed in the headstock. As is well known, two or more lead screws rotationally driven in unison may be employed in the larger machine tools, together with a counterweight system to lessen the forces required to raise or lower the headstock. As here diagrammatically shown, a reversible servo motor YM is directly or indirectly drivingly connected to the lead screw 24.

In the conventional use of a machine tool such as that represented in FIG. 1, a numerical control system 25 receives programmed contouring or positioning data from a suitable input record medium, such as punched tape. It produces trains of command pulses (for the X, Y and Z axes, the first of which is not here illustrated) which in number are proportional to the distances to be traveled from one position to the next along the respective axes and which in frequency are proportional to the desired axis velocity. The Y and Z command pulses are here shown as being fed to digital-to-analog converters 26 and 27, yielding two respective phase modulated sinusoidal ac. signals which shift in phase a predetermined amount for each command pulse. Thus, the analog command signals are phase modulated. By their total change in phase they represent desired or commanded positions along the Y and Z axes (from given starting or reference points); and by their rates of change in phase they represent the desired velocities at which motions along the two axes are to be produced. The two digital-to-analog converters shift the phase of their outputs relative to two reference sine wave voltages which are in constant phase quadrature, these reference voltages being produced within the converters and being common to all axes.

Referring specifically to the Z axis servo drive means, which in all respects is conventional, the analog phase command signal is applied as the input to a closed loop servo including a phase discriminator 29 having a second input (a) from a feedback resolver 30 mechanically coupled by a gear 31 such that its rotor turns in proportion to rotation of the lead screw 19. As is well known, the resolver 30 is a phase shifting device excited by the quadrature reference waves from (b) and produces a sinusoidal output voltage at (a) that shifts in phase according to changes in the actual Z axis position of the quill 18 (and thus of the spindle 17). The discriminator 29 thus functions as a comparator to produce a dc. output voltage proportional in magnitude to, and corresponding in polarity to the sense of, the difference or error between the "actual position" signal from the resolver 30 and the "commanded position" signal from the converter 26. This dc. error voltage is passed through an amplifier 32 to the motor ZM which thus runs in a direction corresponding to the voltage polarity and at a speed proportional to the error, keeping the error at all times very close or constantly equal to zero. It makes no difference that the phase modulated command signal from the converter 26 may roll over more than 360° in phase to call for Z axis motion of considerable distance, since the motor ZM tracks with a following error never so great as to create more than 180° phase displacement between the command and the feedback phase signal.

Thus, the elongated member or spindle 17 with its quill 18, may be moved to various desired positions along a horizontal Z axis by the servo motor ZM in response to command signals injected into a closed feedback loop including the resolver 30.

Absent the improvements embodying the present invention and which are to be described below, the numerically controlled servo loop for the vertical Y axis is essentially the same as that for the Z axis. It includes a phase discriminator 20a, an amplifier 32a and a feedback resolver 30a. The latter is excited by the two phase ac. reference voltage and produces on conductor 30b an output ac. voltage which shifts in phase as the lead screw 24 is turned and the headstock 16 moves vertically, thereby to signal the "actual position" of the headstock. The phase discriminator 29a thus receives the phase modulated command signal from the converter 27, receives the feedback phase modulated signal from the resolver 30a, and produces a dc. error voltage which is applied through the amplifier 32a to the motor YM. In this way, the headstock 16 is moved to various desired positions along the vertical Y axis in response to input command signals derived from the numerical control system 25.

In accordance with the present invention, means are provided to sense the actual position of the elongated member or spindle 17 as it is moved from one location to another along the Z axis, and to create a correction signal which varies as a predetermined function of that actual position. This correction signal is utilized by means for modifying the operation of the servo drive which moves the headstock 16 vertically along the Y axis, with the result that the headstock reaches an actual position higher than that called for by its command signals, and the spindle's extremity or cutter reaches substantially the desired or commanded Y axis position in spite of the sag or droop which may exist for any extended position of the spindle. In other words, the operation of the Y axis servo drive is modified to make the headstock reach a position higher than that called for by its command signals, and by a distance which is equal to the magnitude of the droop or sag at the end of the spindle.

In the specific and detailed embodiment here shown as an example, the means for sensing the spindle's lengthwise or Z axis position take the form of a reduction gear 36 having its input mechanically coupled to the lead screw 19 (and thus to the quill and spindle) and its output connected to a rotatable disc 38 which forms a part of a cam assembly 39. As the spindle is translated through its entire range of Z axis travel by many revolutions of the lead screw 19, the disc 38 turns proportionally through less than one revolution (preferably about 250°) so that for each Z axis position of the spindle there is a corresponding angular position of the disc 38. Fixed about the periphery of the disc is a flexible element or metal band 40 associated with means for adjustably deforming that band. As here shown, the band is tensioned against the ends of circumferentially spaced, radially extending adjustable projections here shown as cap screws 41 threadably inserted into the disc 38. The cam 38, 40 thus formed (and which will be described in more detail below) has an active surface formed by the band 40 and which can be shaped or adjusted. The active surface of the band 40 is engaged by a cam follower 42 disposed on an arm 44 fixed at its other end to the rotor shaft of a differential resolver 45. A tension spring 46 biases the follower firmly against the cam surface.

As is well known, the differential resolver 45 is an inductive coupling device which may receive an ac. excitation voltage on one set of windings (disposed on the stator or rotor) and which produces an output ac. voltage from its other set of windings (disposed on the rotor or the stator), the output being shifted in phase by an angle which is equal or proportional to the physical angle through which the rotor is displaced from its "null" or "zero shift" position. The use of differential resolvers for introducing a phase shift into a servo loop for the purpose of producing modifying corrections is per se known in the art (from U.S. Pat. No. 2,980,388 issued Apr. 18, 1961) and thus the internal construction details and the operation of the resolver 45 need not be here shown or described. But, as explained below, the resolver 45 forms a part of the means for modifying the operation of the Y axis servo drive in response to the correction signal generated by the cam assembly 39.

With the spindle 17 fully retracted to the right into the headstock, the cam 38, 40 and the arm 44 may be initially set so that the rotor of the resolver 45 is in a "zero shift" position. By adjusting the projections or screws 41, the cam may be shaped to an appropriate contour such that the displacement of the follower 42 and the arm 44 (and thus the mechanical signal which their position constitutes) and the angular position of the rotor in the resolver 45 (and thus the phase shift which the resolver will produce) varies as a predetermined function of the spindle's Z axis position. Specifically, the contour of the cam surface formed by the band 40 is adjusted such that the correction signal is proportional to the sag encountered at the extremity of the spindle when the latter is in any of its possible positions. Thus, with the spindle extending half way from the headstock to the position $Z_1$ shown in FIG. 1, and the measured sag or droop being $\Delta Y_1$, the correction signal will be proportional to the quantity $\Delta Y_1$. Correspondingly, when the spindle is fully extended to that position labeled $Z_2$ in FIG. 1, and the observed droop or sag of its extremity is $\Delta Y_2$, then the cam 40 will shift the follower 42, 44 by an amount, and cause the differential resolver 45 to produce a phase shift, which is proportional to the quantity $\Delta Y_2$. The resolver may thus be viewed as a correction signal generator, the correction signal being the phase shift introduced between the incoming signal on terminal 45' and the outgoing signal on terminal 45''.

To couple the correction signal into the Y axis servo loop, it is only necessary to connect the input and output of the differential resolver in series with one of (a) the feedback line leading from the resolver 30a, or (b) the connection which leads from the converter 27 to the input of the discriminator 29a. Of these alternatives, the first is illustrated in FIG. 1 where the output line 30b from the feedback resolver 30a is coupled to the input terminal 45' of the differential resolver 45; and the output terminal 45'' of the latter is then connected to the input of the phase discriminator 26a. This causes a phase shift to be introduced into the servo loop making the feedback input to the phase discriminator 29a appear as if the headstock 16 were in a position lower than that in which it actually resides, and by a distance which is proportional to the displacement of the rotor of the resolver 45 from its "zero shift" position. Thus, when the feedback signal from resolver 30a is of a phase to indicate that the headstock is at an actual position of $Y_1$, and the displacement of the cam follower 42, 44 signifies a correction of $\Delta Y_1$, the output signal at 45'' fed to the input of discriminator 29a makes the servo system respond by moving the headstock 16 to a position of $Y_1 + \Delta Y_1$, where $Y_1$ is the commanded position represented by the phase modulated signal produced from the converter 27.

Although a variety of suitable camming means may be successfully employed, the cam assembly 39 shown generally in FIG. 1 is illustrated in somewhat more detail by FIG. 2. The rotatable disc 38 is formed by a circular plate 50 fixed to a journaled support shaft 52 coupled to the output of the reducing gear 36 so that it is free to rotate through a substantial fraction of one revolution. For space conservation, a segmental plate 51 is bolted to a circular plate, thereby forming the complete disc member 38. Each of the radially extending screws 41 is threaded radially into the periphery of the plate 51 and locked at any given setting by a lock nut 53. The flexible metal band 40 is anchored at 54, and placed in tension over the extremities of the several cap screws 41, being held in a tension by a suitable spring 55. Simply by adjusting the several screws 41, the radial distance from the shaft 52 to the active surface of the band 40 may be changed, and this is particularly so where that radial distance is to be generally progressively greater in a direction counterclockwise around the disc even though the relationship is not necessarily a linear one. The cam follower 42 and its support arm 44 are fixed to the shaft of the differential resolver 45 so that the rotor of the latter is angularly diplaced as a predetermined function of the Z axis position of the spindle 17, that predetermined function being established by ths shape given by adjustment of the band 40.

It is a simple matter to initially establish the desired shape or contour for the band 40, and the predetermined function which that band contour represents. It is only necessary to start with the spindle 17 in its fully retracted position and the cap screw then beneath the follower 42 adjusted such that the rotor of the resolver 45 is in its "zero shift" position. Next, the spindle 17 is progressively extended to successively advanced Z axis positions, and the cam disc 38 will correspondingly rotate to successive angular positions. At each such position, the height of the spindle centerline at its extremity is measured to determine the amount of sag or droop which then exists; and the adjustment screw 41 then beneath the follower is reset until the rotor of the resolver 45 is displaced sufficiently to make the centerline of the spindle extremity have the vertical Y axis position then designated by the Y axis input command signals from the numerical control system 25. This will inevitably result in some corrective raising of the headstock 16 from the commanded Y axis position, but it will make the extended spindle extremity reside in that commanded position despite the fact that some droop or sag exists.

The amount of droop or sag does not necessarily have a linear relationship to the extension of the spindle. But generally speaking, the greater the extension or the greater the weight load constituted by the cutter 23, the greater the droop or sag. Thus, it is readily possible and quickly accomplished to adjust the several cap screws 41 in the cam assembly 30 so as to cause the cam to represent the desired predetermined function necessary to compensate for the sag or droop which will exist when the spindle occupies any of its possible Z axis positions with the particular weight load constituted by the cutter 23 then mounted on the spindle extremity.

Once such adjustments have been made, then the cutter 23 may be replaced with other cutters, and the adjusted setting of the cam band 40 will remain valid if the substituted cutters have approximately the same weight as that first used for the calibration setup. If, however, a cutter of a materially different weight is substituted on the spindle, then it is a simple matter to repeat the cam calibration procedure described above.

In some cases it may be desirable to minimize even the relatively short work interruptions which might be required to recalibrate a single cam assembly 39 each time that a materially different weight load is imposed on the spindle extremity. In keeping with a more detailed aspect of the present invention, it is possible to provide a plurality of cam assemblies and correction signal generators, to calibrate each one initially for a particular but different weight load, and then very quickly switch the appropriate correction signal generator into active operation within the system whenever the corresponding weight load is placed on the spindle extremity. This is illustrated in FIG. 1 wherein a second cam assembly 39a is shown with a construction and organization identical to that of the assembly 39, the distinguishing suffix letters a being applied to the corresponding reference numerals for corresponding parts. It is to be noted that the disc 38a is rotationally driven from the output of the reduction gear 36 in unison with the disc 38, and the flexible band 40a may be adjusted in its contour to represent a predetermined function of the spindle's Z axis position which differs from that predetermined function represented by the contour of the flexible band 40. Thus, while the cam assembly 39 may be initially calibrated for a cutter 23 and cutters of substantially similar but relatively light weight, the cam assembly 39a may be initially calibrated to represent the desired predetermined function associated with a much heavier spindle load, for example, that represented by a right angle attachment.

With such an arrangement, and as shown in FIG. 1, means are provided to selectively switch into operative effect that one of the several correction signal generators which corresponds to any particular weight load which is placed upon the spindle extremity. Thus, the input and output conductors leading to and from the differential resolver 45 are here shown as leading through two normally closed switch contacts 60a, 60b. A parallel circuit through the differential resolver 45a and which includes two normally open switch contacts 60c and 60d is provided. The switch contacts 60a–d are all ganged together so that they may be actuated by a common manual control member 61, as indicated. Thus, when a relatively light load such as the cutter 23 is present on the spindle, an operator need only move the actuator member 61 to the No. 1 position shown so that the assembly 39 and the differential resolver 45 are effective in providing correction in the Y axis servo loop for gravity sag of the spindle. On the other hand, when a heavier weight load is applied to the spindle extremity, and one for which the cam assembly 39a has been calibrated so as to create the desired predetermined function, then the operator need only shift the actuator 61 to its No. 2 position, thereby opening the contacts 60a, b and closing contacts 60c, d so as to render the assembly 39a and the differential resolver 45a effective in modifying the operation of the Y axis servo drive means.

From the foregoing, it will now be apparent that the present invention brings to the art an advantageous system for substantially eliminating the adverse effects or inaccuracies which may be caused by droop or gravity sag of an elongated member or spindle as the latter is extended to different positions and is supported as a cantilever by a support member such as the headstock 16. While the correction signal generator which produces a signal which varies as a predetermined function of the spindle's changing Z axis position may take a variety of different specific forms, the adjustable cam assemblies which have here been described make it quick and convenient to establish the desired predetermined function, or to change from one function to another when the weight loads on the spindle are changed. And, if it is known that a plurality of weight loads will from time to time be employed on the spindle, then the invention may be embodied in an arrangement which includes a plurality of correction signal generators each calibrated to work according to a predetermined function appropriate for one of the different weight loads, and to selectively switch the appropriate generator into operative relationship whenever its corresponding weight load is employed.

I claim:

1. In a system for adjustably extending and retracting along a first horizontal axis an elongated member which thus variably overhangs in cantilever fashion from a horizontally fixed support, the combination comprising first means for moving said member to various commanded positions along said first horizontal axis, second means for moving said support to various commanded positions along a second, vertical axis, means for sensing the actual position in which said member resides along said horizontal axis and for creating a signal which varies as a predetermined function of such position to have a magnitude indicative of the gravity-induced sag of the extremity of said member, and means for modifying the operation of said second moving means with said signal to cause said support to move to an actual position which is higher than the commanded position by a distance which is proportional to that signal, whereby the inaccuracies in the vertical position of the extremity of said member introduced by gravity are substantially removed for all horizontal positions of the member.

2. In a system for adjustably extending and retracting along a first horizontal axis an elongated member which thus variably overhangs in cantilever fashion from a horizontally fixed support, the combination comprising first servo drive means responsive to first command signals for moving said member to various desired positions along said horizontal axis, second servo drive means responsive to second command signals for moving said support to various desired positions along a second, vertical axis, a camming element mechanically coupled to said member and moved to positions which correspond to the various horizontal positions in which said member resides, a follower element riding on said camming element and mechanically coupled to a signal generating means, said camming element having a predetermined shape to make the signal from said generating means have a magnitude proportional to the gravity-induced sag of the extremity of said member as the latter takes on different horizontal positions, means coupling said signal generating means to said second servo drive means to cause said support to be moved to an actual position which is higher along the second vertical axis than that designated by the second command signals, whereby the extremity of said member will always have a vertical position substantially corresponding to that designated by the second command signals despite changes in the member's horizontal position and its gravity droop.

3. In a control system for a machine tool having a headstock and a spindle supported by but extendable from the headstock to different positions along a horizontal Z axis, the combination comprising first servo drive means responsive to first command signals for moving said spindle to various desired extended positions along said Z axis, second servo drive means responsive to second command signals for moving said headstock to various desired positions along a vertical Y axis, means mechanically coupled to said spindle for producing a signal which varies as a predetermined function of the spindle's Z axis position to be proportional to the gravity-induced sag of the extremity of the spindle, means for injecting said signal into said second servo drive means to cause the headstock to move to a compensated position different from the commanded, desired Y axis position but which results in the extremity of the spindle, regardless of its Z axis position, residing substantially in the commanded, desired Y axis position.

4. The combination set forth in claim 3 further characterized in that said signal-producing means includes a cam mechanically coupled to be shifted to different positions as the spindle is driven to different Z axis positions and a cam follower coupled to actuate a signal generating device, said cam having an active surface formed by a flexible element and engaged by said follower, and means for adjustably deforming said flexible element to establish and change said predetermined function, whereby said predetermined function can be changed, when the weight load on the end of said spindle is changed, without replacing said cam.

5. The combination set forth in claim 3 further characterized in that said second servo drive means comprises a phase servo including means to produce a variable phase command signal, means to produce a feedback signal which varies in phase as the actual Y axis position of the spindle changes, a servo motor coupled to move the spindle along the Y axis, and means to compare said phase command and feedback signals and to energize said motor according to any difference in the respective phases thereof, and further including a. a differential phase shifting resolver through which one of the command and feedback signals is routed, and b. means for mechanically positioning the rotor of said resolver as a predetermined function of the Z axis position of said spindle.

6. In a system for adjustably extending and retracting along a first horizontal axis an elongated member which thus variably overhangs in cantilever fashion from a horizontally fixed support, the combination comprising first means for moving said member to various commanded positions along said first horizontal axis, second means for moving said support to various commanded positions along a second, vertical axis, means mechanically coupled to said member and shifted proportionally in position according to changes in the position of the member along the first axis, for producing a signal which varies as a predetermined function of such position to have a magnitude indicative of the gravity-induced sag of the extremity of said member, means for mechanically adjusting said last-named means to change said predetermined function when the weight load on the extremity of said member is changed, and means for modifying the normal operation of said second moving means with said signal to cause said support to move an actual position which is higher than commanded position by a distance which is proportional to such signal, whereby inaccuracies in the vertical position of the extremity of said member introduced by gravity are substantially removed for all horizontal positions of the member.

7. The combination set forth in claim 6 further characterized in that said signal producing means includes a cam mechanically coupled to said member, a follower riding on the cam and coupled to shift a signal creating device, said cam having an active surface adjustable in its configuration and means to adjust such configuration, thereby to afford changes in said predetermined function, without changing the cam, whenever the weight load on the spindle is changed.

8. In a system for adjustably extending and retracting along a first horizontal axis an elongated member which thus variably overhangs in cantilever fashion from a horizontally fixed support, the combination comprising first means for moving said member to various commanded positions along said first horizontal axis, second means for moving said support to various commanded positions along a second, vertical axis, a plurality of signal producing devices all mechanically coupled to said member and each producing a signal which varies as a different predetermined function of the horizontal axis position of that member, each of said predetermined functions being chosen such that the signal from the associated device is indicative of the gravity sag of the extremity of the member with a respective one of a plurality of different weight loads on that extremity, selector means for injecting the signal from any desired one of said devices into said second driving means, and said second driving means including means responsive to any of said injected signals for causing said support to be positioned higher than the command position along said vertical axis and by an amount which corresponds to the magnitude of the actively injected signal.

* * * * *